United States Patent
McClelland

(10) Patent No.: US 6,366,083 B1
(45) Date of Patent: Apr. 2, 2002

(54) METHOD FOR MEASURING THE THICKNESS OF OXIDE LAYER UNDERLYING CRUD LAYER CONTAINING FERROMAGNETIC MATERIAL ON NUCLEAR FUEL RODS

(75) Inventor: Richard G. McClelland, Richland, WA (US)

(73) Assignee: Framatome ANP Inc., Lynchburg, VA (US)

( * ) Notice: Subject to any disclaimer, the term of this patent is extended or adjusted under 35 U.S.C. 154(b) by 0 days.

(21) Appl. No.: 09/398,536

(22) Filed: Sep. 17, 1999

(51) Int. Cl.$^7$ ............... G01B 7/06; G01N 22/77; G01R 33/12
(52) U.S. Cl. .................. 324/230; 324/232; 324/233
(58) Field of Search .................. 324/228, 229, 324/230, 231, 232, 233

(56) References Cited

U.S. PATENT DOCUMENTS 4,673,877 A   6/1987  Sumittomo ............. 324/225
5,191,286 A * 3/1993  Fischer ............. 324/230
5,341,678 A   8/1994  Kervinen ............ 73/150 R
5,889,401 A * 3/1999  Jourdain et al. ....... 324/230

OTHER PUBLICATIONS

European search report dated Dec. 15, 2000 to European Patent application corresponding to present application.

* cited by examiner

Primary Examiner—Safet Metjahic
Assistant Examiner—Reena Aurora
(74) Attorney, Agent, or Firm—Kenyon & Kenyon

(57) ABSTRACT

A method for measuring the thickness of an oxide layer formed on the cladding surface of nuclear fuel rods and underlying a crud layer containing ferromagnetic material using eddy current lift-off measurements by exciting a probe coil at a first frequency which penetrates only into the crud layer and by exciting a probe coil at a second frequency which penetrates the crud layer, the oxide layer and into the cladding of a nuclear fuel rod. By subtracting vectorally the complex impedance resulting from exciting the probe coil at the first frequency from the complex impedance resulting from exciting the probe coil at the second frequency, the thickness of the oxide layer formed on the cladding is measured.

6 Claims, 1 Drawing Sheet

B-A   Lift-off locus for non-magnetic material
A-C   Permeability locus for magnetic material
C-D   Conductivity locus for magnetic material
C-E   Thinning locus for magnetic material B-A   Lift-off locus for non-magnetic material
A-C   Permeability locus for magnetic material
C-D   Conductivity locus for magnetic material
C-E   Thinning locus for magnetic material

METHOD FOR MEASURING THE THICKNESS OF OXIDE LAYER UNDERLYING CRUD LAYER CONTAINING FERROMAGNETIC MATERIAL ON NUCLEAR FUEL RODS

FIELD OF THE INVENTION

The present invention relates generally to eddy current test methods for measuring the thickness of one or more conductive layers of ferromagnetic and non-ferromagnetic crud and zirconium oxide formed on nuclear fuel rod cladding of nuclear fuel elements, and to eddy current test methods for accurately measuring the thickness of zirconium oxide layer located between the zirconium alloy fuel rod cladding and one or more electrically conductive layers of ferromagnetic and/or non-ferromagnetic crud.

BACKGROUND OF THE INVENTION

During nuclear reactor operation, nuclear fuel rods which are arranged in each nuclear fuel assembly are submerged in coolant/moderator in the reactor core. In light water reactors using zirconium or Zircaloy cladding tubes for the fuel rods, as a result of the reaction between the water coolant moderator and the zirconium in the cladding tubes, zirconium oxide forms on the fuel rods which can accumulate to a thickness of approximately 200 $\mu$m. Because of the adverse effects of the zirconium oxide on the heat transfer from the fuel rod cladding tube to the coolant/moderator, and the thinning of the cladding wall thickness due to metal loss affecting the structural integrity of the cladding, there is a limit on the maximum amount of oxide that is permitted on each fuel rod. Once this limit is reached for a fuel rod, it must be removed from service.

In normal water chemistry reactors (e.g. those that do not have zinc or noble metals added to the water coolant/moderator), typically no or limited amounts of crud is deposited on the fuel rods and standard eddy current lift-off measurement techniques can be used. Such standard techniques measure a parameter (e.g. lift-off vector) produced by the zirconium oxide layer which is then correlated to the thickness of the zirconium oxide layer.

However, the reactor coolant can transport dissolved particles from reactor coolant system components and piping and deposit such dissolved particles on the nuclear fuel rods.

In boiling water reactors (BWR) which have admiralty brass components in steam condensers, and in those BWR and pressurized water reactors (PWR) using zinc injection water chemistry, a ferromagnetic crud also forms on the fuel rods. For example, in reactors using zinc injection chemistry, a layer of zinc spinel ($ZnFe_4O_2$) as well as hematite form a tenacious crud layer over the top of the zirconium oxide layer. This crud layer is ferromagnetic due to the presence of iron. Furthermore, the alloy formed by the iron and zinc affects the conductivity and permeability of the crud layer. Measurement of the thickness of both the crud layer and the thickness of the oxide layer are critical for the accurate evaluation of nuclear fuel rod thermal hydraulic performance as well as compliance with fuel rod operating limits, and fuel rod life span.

However, the ferromagnetic material in the crud layer interferes with the standard eddy current lift-off measurement used to determine the thickness of the fuel rod cladding oxide layer. The crud layer having ferromagnetic material has not been measured accurately by the prior art methods which have caused or resulted in an overestimation of the thickness of the cladding oxide layer.

Standard lift-off measurements for measuring the thickness of a corrosion layer or layers employs a probe having a coil(s) of conductive wire which is placed on the surface of the fuel rod. As the coil is lifted off of the surface of the test specimen, the impedance of the coil changes in response to the decreasing effects of the eddy currents produced in the part of the test specimen. The trace the coil produces is called the lift-off vector. When testing nuclear fuel rods, the conductivity of the base or cladding material does not change, which therefore does not effect the retrace path of the lift-off curve. The impedance change is supposed to directly correlate to the distance the eddy current coil is lifted off of the test specimen. As shown in an impedance chart and depicted in FIG. 1, the ferromagnetic material and its associated permeability locus (depicted as that part of FIG. 1 from point A to point C) are in the same basic direction as the lift off curve (depicted as that part of FIG. 1 from point B to point A) for non-magnetic base material (i.e. the fuel rod cladding). A shift in the lift-off locus direction and magnitude is caused by the ferromagnetic crud layer. When this shift in the lift-off locus direction and magnitude is added to the lift-off locus from the non-magnetic base material as is typical for prior art devices, the oxide thickness on the fuel rod is incorrectly determined to be thicker than in actuality by as much as ten times.

The prior art methods of measuring the thickness of the layer of crud containing ferromagnetic material and the zirconium oxide layer on the fuel rod cladding include the necessity of using a correction factor based on anticipated affects of the ferromagnetic crud layer. The correction factor is determined assuming that the effects of the crud layer containing ferromagnetic material are a linear function of thickness. However, this assumption does not represent a correct or even an accurate representation of the actual condition of the crud, which changes thickness, composition, and permeability along the axial length of the fuel rod cladding. Accordingly, this correction factor and assumptions themselves introduce significant aberrations in the actual thickness verses the reported thickness. This correction factor is subtracted from the collected data and only provides a virtual total thickness of the crud layer and the zirconium oxide layer. The thickness of each of the crud layers containing ferromagnetic material and the zirconium oxide layer cannot be determined by such prior art methods.

It would thus be an advantage over prior art devices and methods to accurately measure the thickness of a crud layer containing ferromagnetic material formed on a nuclear fuel rod cladding.

It would thus be a further advantage over prior art devices and methods to accurately measure the thickness of a zirconium oxide layer formed on the surface of nuclear fuel rod cladding.

It would thus be yet a further advantage over prior art devices and methods to accurately measure each of the thicknesses of the crud layer containing ferromagnetic material and of the zirconium oxide layer formed on the surface of nuclear fuel rod cladding.

SUMMARY OF THE INVENTION

In accordance with the present invention, a method is provided for determining the thickness of a layer of substantially oxide material on the surface of the cladding of a nuclear fuel rod when said layer of substantially oxide material has an overlying layer of substantially ferromagnetic material, the layer of substantially oxide material having an unknown thickness, comprising the steps of:

placing a probe of an eddy current sensor on the surface of the layer of substantially ferromagnetic material, the probe having a coil excited with an alternating current having a first frequency selected for penetrating only into the layer of substantially ferromagnetic material and producing a first complex impedance of said probe representative of the permeability change and thickness change and conductivity change of the layer of substantially ferromagnetic material, the coil being excited with an alternating current having a second frequency selected for penetrating into the layer containing ferromagnetic material and the layer of oxide material and the cladding of the nuclear fuel rod and producing a second complex impedance of said probe representative of the permeability change and thickness change and the conductivity change of the layer containing ferromagnetic material and the measured change in lift-off produced by the layer substantially oxide material; exciting said probe with an alternating current having the first frequency and the second frequency; measuring the first complex impedance and the second complex impedance; phase rotating the first complex impedance so that its polarity is 180° from the second complex impedance; and adding the second complex impedance to the phase rotated first complex impedance, said addition producing a resultant complex impedance representative of the thickness of the layer of substantially oxide material.

DETAILED DESCRIPTION OF THE INVENTION

Figure 1:
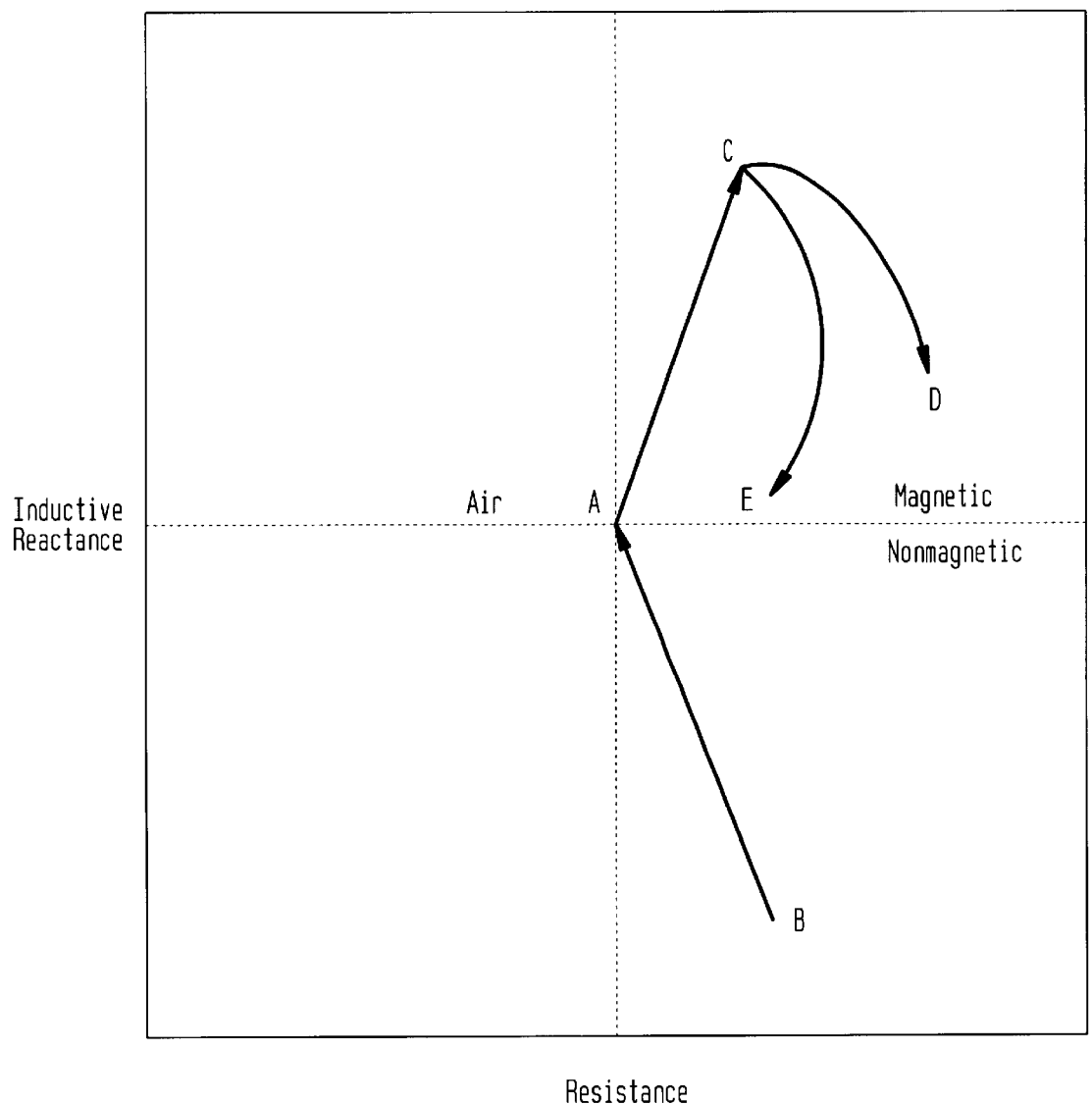
FIG. 1 is a complex impedance diagram in which the inductive reactance is plotted against the resistance for an eddy current probe separated from fuel rod cladding.

In accordance with one aspect of the present invention, an eddy current coil is operated at a first frequency, typically 10 MHz. The depth of eddy current penetration is inversely related to frequency:

$$S = \sqrt{\frac{1}{\pi f \mu_0 \mu \sigma}} \quad \text{[Equation 1]}$$

where

S=standard depth of penetration (where the eddy current density has decayed to 37% of its surface value);

f=frequency of operation of eddy current probe;

$\mu_o$=universal magnetic permeability or permeability of air;

$\mu$=relative magnetic permeability of the test specimen or material; and $\iota$=conductivity of the test specimen or material.

By so selecting a high frequency of 10 MHz, the changes in the eddy current coil impedance will measure only the crud permeability, thickness and conductivity since this frequency is sufficiently high that it will not penetrate deep enough to be affected by the conductivity of the fuel rod cladding material, typically Zircaloy. From this measurement, the thickness, permeability, and conductivity change of the crud layer containing ferromagnetic material are measured. This method is more accurate than prior art methods since it penetrates only into the crud layer containing ferromagnetic material and since it measures the actual and changing characteristics of the crud layer containing ferromagnetic material to obtain actual thickness data for the specific ferromagnetic material encountered, and not from ferromagnetic materials which are merely similar to those actually found on the fuel rod cladding.

In accordance with another aspect of the present invention, a second frequency is applied to the same coil that will cause the eddy currents to penetrate into the crud and into the oxide layer and into at least one standard depth of penetration into the fuel rod cladding. The depth of eddy current penetration as a function of frequency is once again governed by Equation 1. Alternatively, a second coil can be used instead of one coil.

By employing a lower second frequency, preferably 2–3 MHz, chosen to penetrate into the crud, oxide layer and the fuel rod cladding, the changes in the eddy current coil impedance will be a composite of the zirconium oxide layer lift-off vector (assuming constant conductivity of fuel rod cladding) and the ferromagnetic crud conductivity, thickness and permeability vectors.

When using standard eddy current measuring techniques, the induced eddy current in the non-magnetic fuel rod cladding oppose the induced eddy current produced by the eddy current probe. When the fuel rod cladding has an overlying crud including ferromagnetic material, the induced eddy currents in the overlying layer of crud are much larger than and in phase (i.e. additive) from the eddy current produced in the non-magnetic fuel rod cladding. This tends to bias the measurement of the thickness of the layer(s) overlying the fuel rod cladding suggesting that the layer(s) is thicker than in actuality.

In accordance with the present invention, by subtracting vectorally (a) the measured parameters i.e. the permeability and the thickness loci of the ferromagnetic crud obtained by operating an eddy current coil at the higher frequency from (b) the measured parameters reflecting the thickness of the zirconium oxide (i.e. lift-off locus) and the ferromagnetic crud layer (i.e. the combined permeability and thickness loci) obtained by operating an eddy current coil at the lower frequency, the resulting impedance signal represents data only from the zirconium oxide layer lift-off vector, the ferromagnetic crud layer affects being cancelled. The error or bias discussed above is thereby eliminated, yielding data representing the actual thickness of the zirconium oxide layer. The measurement using high frequency to induce eddy currents in the ferromagnetic material does not include an error because there isn't an interaction between the induced eddy currents of the ferromagnetic and non-magnetic materials.

When using a multi-frequency eddy current tester with either a dual or a single coil, the information from the higher frequency is extracted from the information from the higher and lower frequency total signal by using filters in the eddy current tester. The information from the higher frequency signal is phase rotated so that its polarity is 180° from the lower frequency signal. The high frequency signal and low frequency signal are then amplitude corrected, phase added, and filtered. The resulting impedance signal represents data only from the zirconium oxide lift-off vector, the ferromagnetic crud layer affects being cancelled. Additionally, the thickness vector (shown in FIG. 1 as the thinning locus represented on the graph between points C and E) of the ferromagnetic crud layer can be compared to a standard to determine the crud layer thickness. If any variation of the composition of the ferromagnetic crud layer occurs such as from the presence of cobalt or nickel, either in the permeability locus (FIG. 1 point A to point C) or conductivity locus (FIG. 1 point C to point D), such changes can be identified by phase shifts in the permeability and/or conductivity loci.

Alternatively, the phase addition can be performed off-line on a computer.

The advantages of the present invention are that the actual property and thickness changes of the ferromagnetic crud can be measured directly. Prior art methods rely on simulated crud thickness and properties, which affects the accuracy of measurements. The methodology of the present invention does not apply a false approximation to obtain crud layer and oxide layer data. In accordance with the present invention, the thickness of the ferromagnetic crud layer and the zirconium oxide layer are each measured, rather than approximated using correction factors, thereby providing an actual measure for evaluating fuel performance and operating margin.

Thus, the present invention enables the accurate measurement of:

(a) the thickness of a ferromagnetic layer of varying thickness and permeability covering a non-electrically conductive oxide layer;

(b) the thickness of an oxide layer under a ferromagnetic conductive layer; on a base of a non-ferromagnetic conductive material.

Furthermore, the present invention can be applied to any measurement of a multiple layer coating over a non-ferromagnetic conductive base through a ferromagnetic top layer.

While the present invention has been particularly shown and described with reference to preferred embodiments thereof, it will be understood by those skilled in the art that various changes in form an details may be made therein without departing from the spirit and scope of the invention.

What is claimed:

1. A method for determining the thickness of a layer of an oxide material on the surface of the cladding of a nuclear field rod when said layer of oxide material has an overlying crud layer containing ferromagnetic material, the layer of oxide material having an unknown thickness, comprising the steps of:

a) placing a probe on an eddy current sensor on the surface of the crud layer containing ferromagnetic material, the probe having a coil excited with an alternating current having a first frequency selected for penetrating only into the crud layer containing ferromagnetic material and producing a first complex impedance of said probe representative of the permeability change and thickness change and conductivity change of the crud layer containing ferromagnetic material, the coil being excited with an alternating current having a second frequency selected for penetrating into the crud layer containing ferromagnetic material and the layer of oxide material and the cladding of the nuclear fuel rod and producing a second complex impedance of said probe representative of the permeability change and thickness change and the conductivity change of the crud layer containing ferromagnetic material and a change in lift-off produced by the layer of substantially oxide material;

b) exciting said probe with an alternating current having the first frequency;

c) exciting said probe with an alternating current having the second frequency;

d) measuring the first complex impedance and the second complex impedance;

e) phase rotating the first complex impedance so that its polarity is 180° from the second complex impedance;

f) adding the second complex impedance to the phase rotated first complex impedance, said addition producing a resultant complex impedance representative of the thickness of the layer of substantially oxide material.

2. The method as in claim 1 wherein the oxide material of the layer of oxide material is an oxide of zirconium.

3. The method as in claim 1 wherein the second frequency is from 2–3 MHz.

4. The method as in claim 1 where the first frequency is 10 MHz.

5. The method as in claim 4 wherein the second frequency is from 2–3 MHz.

6. The method as in claim 5 wherein the oxide material of the layer of substantially oxide material is an oxide of zirconium.

* * * * *

UNITED STATES PATENT AND TRADEMARK OFFICE
CERTIFICATE OF CORRECTION

PATENT NO. : 6,366,083 B1
DATED : April 2, 2002
INVENTOR(S) : Richard G. McClelland It is certified that error appears in the above-identified patent and that said Letters Patent is hereby corrected as shown below:

Column 2,
Line 2, change "employs" to -- employ --;
Line 10, change "effect" to -- affect --;
Line 30, change "affects" to -- effects --;

Column 3,
Line 17, change "layer" to -- layer of --;
Line 54, change "ʋ" to -- σ --;

Column 4,
Line 25, change "from" to -- with --;
Line 40, change "affects" to -- effects --;
Line 58, change "affects" to -- effects --;

Column 5,
Line 30, change "an" to -- and --.

Signed and Sealed this

Thirty-first Day of December, 2002

JAMES E. ROGAN
*Director of the United States Patent and Trademark Office*